United States Patent Office 3,465,604
Patented Sept. 9, 1969

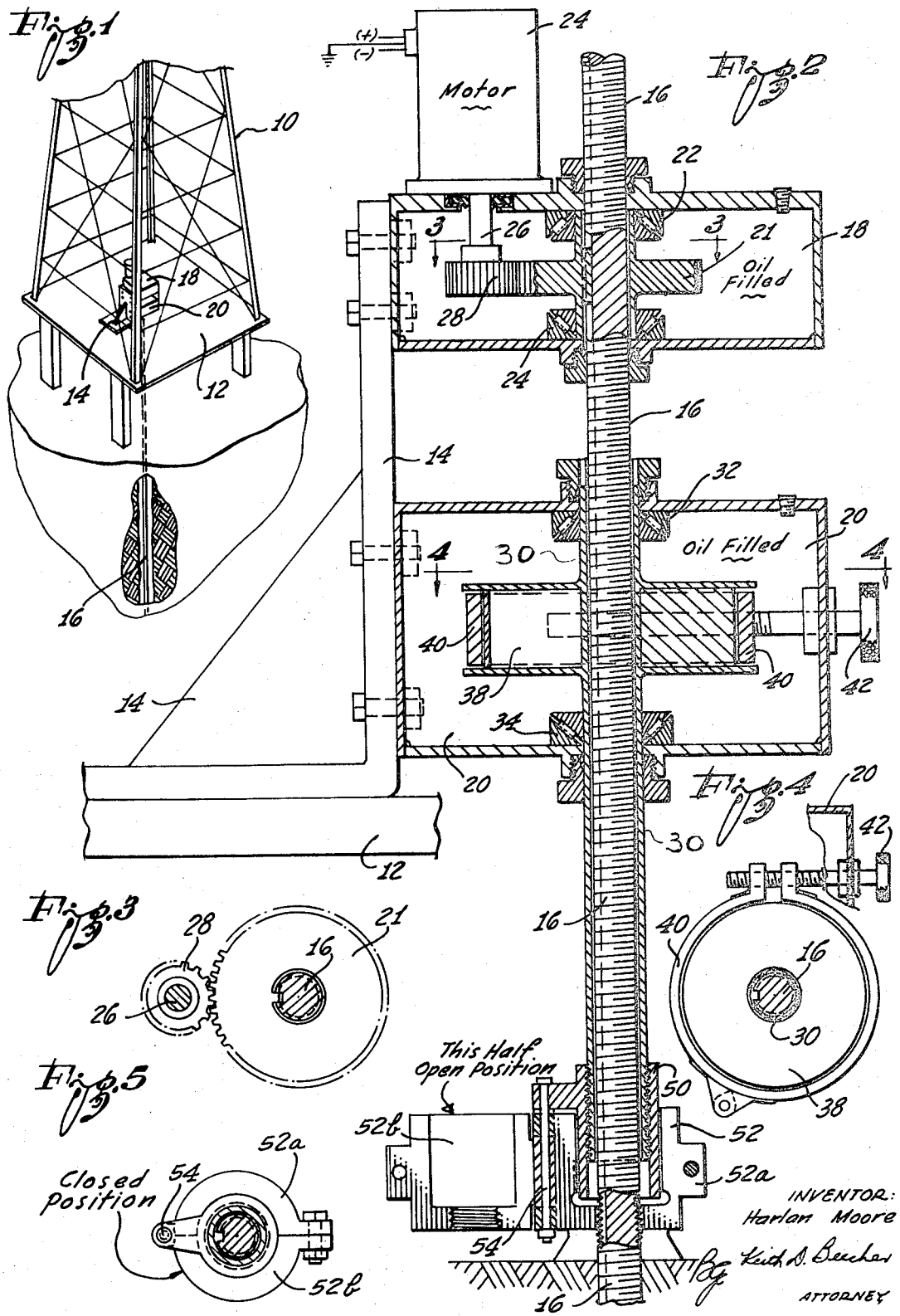

3,465,604
DRIVE MECHANISM FOR DRILLING
APPARATUS AND THE LIKE
Harlan Moore, 1523 Harvard,
Santa Monica, Calif. 90404
Filed Apr. 20, 1967, Ser. No. 632,399
Int. Cl. F16h 29/20
U.S. Cl. 74—89.15                                    3 Claims

ABSTRACT OF THE DISCLOSURE

The disclosure concerns a drive mechanism which finds utility, for example, in oil well drilling apparatus, or the like; and which includes a threaded rod and a coaxial sleeve, intercoupled so that a braking action exerted on the sleeve causes it to function as a lead screw to cause the threaded rod to move in a linear direction.

SUMMARY OF THE INVENTION

The drive mechanism of the invention includes a threaded rod and a surrounding coaxial sleeve threaded to the rod, as mentioned above. The rod is rotatably driven, and so long as the sleeve is permitted to rotate freely, the rod does not move linearly. A brake is provided which, when actuated, inhibits the rotational movement of the sleeve. This sets up a lead screw action so that the rod is caused to move in a linear direction. The linear movement of the rod can be started and stopped merely by actuating and releasing the brake. Also, the direction of linear movement of the rod can be changed by reversing the rotational drive. In addition, the speed of linear movement of the rod can be controlled by controlling the amount of slippage of the brake.

BRIEF DESCRIPTION OF THE DRAWINGS

FIGURE 1 is a partial perspective view of a typical oil well drilling rig, in which the improved drive mechanism of the invention may be incorporated;

FIGURE 2 is a side elevation, partly in section, showing the details of one embodiment of the drive mechanism of the invention;

FIGURE 3 is a view, taken substantially along the line 3—3 of FIGURE 2, and showing the relationship between various drive gears included in the mechanism of the invention;

FIGURE 4 is a view, substantially along the line 4—4 of FIGURE 2, and showing details of a brake mechanism which is also included in the mechanism of the invention; and FIGURE 5 is a cross-sectional view of the embodiment of the invention of FIGURE 2, and showing a coupling member which serves to couple in a controllable manner, certain of the components of the mechanism.

DESCRIPTION OF ONE EMBODIMENT OF THE INVENTION

As is well known, one means for drilling an oil well uses, for example, a rotatably driven drilling bit; the bit being mounted on the lower end of a string of drill pipes. Several different types of motive power may be used to provide the required rotational motion to the drill pipes and the drilling bit. The power is usually transmitted mechanically by chain or belt from the motor, or other source of power, to the drilling pipes and bit.

The present invention finds particular utility in oil well drilling apparatus, although its field of use is by no means limited to such an application. A feature of the invention is that it provides an improved and simplified clutching action, whereby the drive motor may be continually activated, with a selective rotational drive being imparted to the drill, by the adjustment of a brake, as will be described. The brake provides a simple means, not only of starting and stopping the linear movement of the drill bit at will, but also of controlling the linear speed of the drill.

Again, it should be pointed out that although the apparatus of the invention is described herein in conjunction with oil well drilling apparatus, and the like, it has a wider application. That is, the apparatus of the invention can be used wherever it is desired to provide a linear drive action, which can be readily and economically controlled.

A typical oil well derrick is shown in FIGURE 1, and is designated as 10. The derrick includes a lower platform 12, on which the oil well drilling apparatus is mounted. In the particular embodiment of the invention under consideration, a bracket 14 is mounted on the platform 12, and this bracket supports the drilling apparatus. As will be described, for example, the function of the drilling apparatus is selectively to drive a threaded rod 16 so that the linear movement of the threaded rod down into the well, or up out of the well, can be readily controlled. The aforesaid drill pipes are mounted in a string on the lower end of the threaded rod 16 in accordance with usual well drilling techniques, and the usual bit is mounted at the lower end of the lowermost drill pipe. A hole may be provided down the longitudinal axis of the rod 16, so that a suitable coolant may be passed to the bit.

As shown in FIGURE 2, for example, a first housing 18 and a second housing 20 are mounted one above the other on the bracket 14, and the threaded rod 16 extends through the two housings. The first housing 18 encloses a gear 21 which is splined to the shaft 16 (as shown in FIGURE 3) so that the shaft 16 may move linearly with respect to the gear 21. The gear 21 is rotatably mounted in the housing 18 by usual thrust bearings 22 and 24.

A motor 24 is mounted adjacent the housing 18, and the drive shaft 26 of the motor extends into the housing. The motor may be electric, diesel, or any other appropriate type. A pinion 28 is mounted on the end of the drive shaft, and this pinion engages the gear 21, so that when the motor 24 is energized, the resulting rotational motion may be transmitted to the gear 28 and to the gear 21. The housing 18 may be oil filled for lubricating purposes, and appropriate packing glands may be provided, both for the threaded rod 16 and for the drive shaft 26 of the motor 24. The motor 24 may be placed in any other suitable location, and any appropriate coupling may be used.

A sleeve 30 is mounted in coaxial relationship with the threaded rod 16. This sleeve is mounted in bearings 32 and 34 in the housing 20 to be freely rotatable. The housing 20, likewise, may be oil filled for lubricating purposes, and appropriate packing glands are provided for the threaded rod 16.

A brake drum 38 is mounted on the sleeve 30 to be rotatable with the sleeve. A brake band 40 extends around the drum, and the band may be tightened onto the drum by means, for example, of a manually adjustable control 42, or other appropriate means. It will be appreciated that so long as the band 40 is released, the sleeve 30 and the brake drum 38 freely rotate as the motor 28 imparts rotation to the threaded shaft 16.

A tubular member 50 is threaded to the lower end of the sleeve 30 and extends beyond the end of the sleeve. A further tubular member 52 is mounted on the tubular member 50. The latter member 52 has two parts 52a and 52b which are hinged together by means, for example, of a hinge pin 54, the hinge pin being supported on the tubular member 50. The lower end of the member 52 is threaded, so that when the two parts 52a and 52b are brought together into the position shown, for example, in FIGURE 5, and latched by any suitable latching means, the member 52 is threadably coupled to the threaded rod 16. However, when the two parts 52a and 52b are opened out away from the threaded rod, the rod is released, insofar as the member 52 is concerned. It will be appreciated that when the parts 52a and 52b are opened, the threaded rod 16 can be freely moved upwardly within the sleeve 30, with the gear 21 sliding on the rod by virtue of its splined relationship.

When the apparatus is used in conjunction with oil well drilling apparatus, it is appropriate to open up the members 52a and 52b so as to permit the threaded rod 16 to be pulled to an upper position, each time a new drill pipe is to be coupled into the string. Also, when so desired, the tubular member 50, together with the member 52 may be unscrewed from the end of the sleeve 30, so as to permit the sleeve itself to be removed for servicing or replacement purposes.

When the illustrated apparatus is in an operational state, with the parts 52a and 52b of the member 52 closed and latched, it will be appreciated that so long as the brake band 40 is released, the rotation of the motor 28 merely causes the rod 16 to rotate, and also causes the sleeve 30 to rotate, since the latter is freely rotatable. Under these conditions, there is no linear movement of the threaded rod 16.

However, as the brake band 40 is tightened on the drum 38, the rotational movement of the sleeve 30 is inhibited. Now, there is relative rotational movement between the rod 16 and the sleeve 30, so that a lead screw relationship is set up by virtue of the threads at the lower end of the member 52. Therefore, the threaded rod 16 starts to move in a linear direction. The direction of movement, of course, is dependent upon the direction of rotation imparted to the rod by the motor 24.

As the brake band 40 is tightened, brake slippage is decreased, and the rotation of the sleeve 30 is made less and less. This means that the speed of linear movement of the threaded rod is increased to a maximum. The maximum linear speed of the rod 16 occurs when the brake drum 38 and the sleeve 30 are prevented from rotating by the braking action of the brake band 40, and the linear speed of the rod is then a function of the speed of the motor 24 and the pitch of its threads.

It will be appreciated, therefore, that a simple control of the illustrated drilling apparatus can be achieved merely by a manipulation of the control 42. Also, the apparatus provides a simple means for releasing the inner rod 16, whenever it is desired to move the rod independently of the sleeve.

While a particular embodiment of the invention has been described, it will be appreciated that modifications may be made. The following claims are intended to cover all modifications which come within the scope of the invention.

What is claimed is:

1. A drive mechanism including in combination: a support bracket; an elongated sleeve member rotatably mounted on said support bracket and having an internally threaded portion; an elongated externally threaded rod extending through said sleeve in coaxial relationship therewith and threadably coupled to said internally threaded portion of said sleeve; a drive motor mounted on said support bracket and mechanically coupled to said rod to impart rotational motion to said rod, said rod thereby moving linearly with respect to said support bracket upon relative rotation between said rod and said sleeve member and in a direction determined by the direction of rotation of said rod; and a braking mechanism mounted on said support bracket for selectively engaging said elongated sleeve controllably to inhibit the free rotation thereof as said rod is rotated by said driving mechanism, thereby to produce relative rotation between said rod and said sleeve and resultant linear movement of said rod with respect to said support bracket.

2. The drive mechanism defined in claim 1 in which said internally threaded portion of said sleeve is incorporated into a tubular end member including a plurality of hinged parts, and which may be opened to disengage said sleeve from said threaded rod.

3. The drive mechanism defined in claim 1 in which said brake mechanism includes a brake drum mounted on said sleeve and rotatable therewith, a brake band extending around said drum, and an adjustable control member mounted on said support bracket and coupled to said band for controlling the frictional engagement of said band with said drum.

References Cited

UNITED STATES PATENTS

| | | |
|---|---|---|
| 1,297,215 | 3/1919 | Mason. |
| 2,353,006 | 7/1944 | Beltz _____ 173—145 XR |
| 2,477,701 | 8/1949 | McCallum. |

FRED C. MATTERN, Jr., Primary Examiner

F. D. SHOEMAKER, Assistant Examiner

U.S. Cl. X.R.

74—424.8